Sept. 25, 1923.                                                1,468,976
J. RICKART
CLASP FOR REMOVING DISK CLUTCHES ON AUTOMOBILES
Filed April 17, 1922
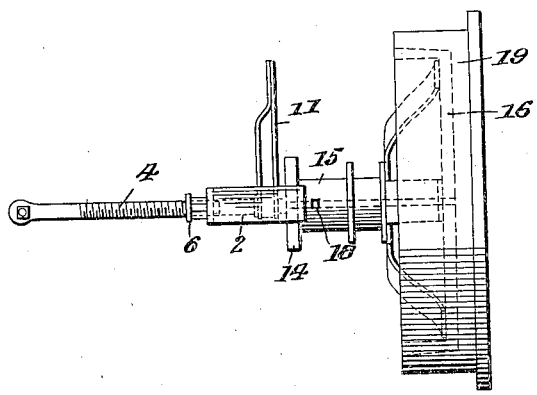
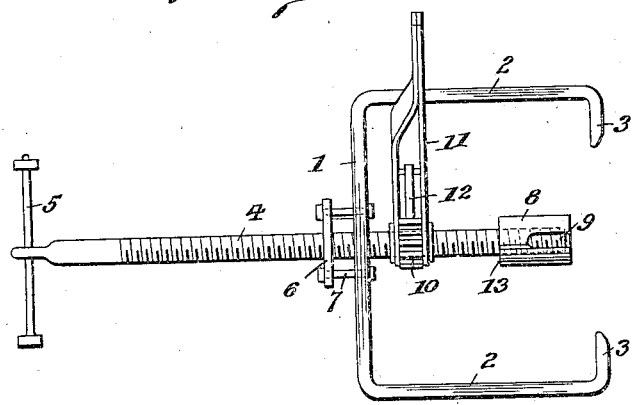
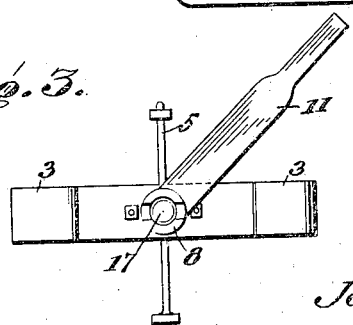
Inventor
John Rickart.
By William J. Jacobi
Attorney Patented Sept. 25, 1923.

1,468,976

UNITED STATES PATENT OFFICE.

JOHN RICKART, OF PALMYRA, MISSOURI.

CLASP FOR REMOVING DISK CLUTCHES ON AUTOMOBILES.

Application filed April 17, 1922. Serial No. 553,778.

*To all whom it may concern:*

Be it known that JOHN RICKART, a citizen of the United States, residing at Palmyra, in the county of Marion and State of Missouri, has invented certain new and useful Improvements in Clasps for Removing Disk Clutches on Automobiles, of which the following is a specification.

This invention relates to wheel pullers, the object in view being to produce a simple and effective device of the class described having a convenient and reliable operating means whereby a gradual and powerful pull may be had on a wheel which is mounted fast on a shaft and cannot well be removed by hand, the operating device enabling a step by step movement to be imparted to the jack screw which operates against the end of the shaft from which the wheel is to be removed.

A further object of my invention is to provide a disk clutch remover, particularly adapted for use in removing the disk clutch from the well known Chevrolet engine. In removing the clutch of a Chevrolet engine, for the purpose of making repairs or any other reason therefor, it is necessary to compress the clutch spring carried in the hub of the clutch, so that the clutch spring retaining pin positioned in the end of the clutch spring tension rod, can be brought into engagement with openings in the hub for the purpose of removing the retaining pin before the clutch can be removed, which has heretofore proved a very difficult proposition, but with the use of my improved wheel and clutch puller, it will be readily seen as the description proceeds, and as is specifically pointed out in the claims, that I have provided a device for accomplishing this purpose that is simple in construction and operation, durable, efficient for the purpose intended, and one that can be manufactured and placed on the market at a relatively low cost.

These and like objects of my invention, will be better understood as the description proceeds, taken in connection with the accompanying drawing, which forms a part of this specification, and in which Figure 1 is a side elevation of my improved disk clutch remover, showing same applied or attached to the hub of a clutch.

Figure 2 is a plan view of the device removed from the clutch, and

Figure 3 is an end view of same, looking in the direction from where same would engage a clutch or wheel.

Referring to the accompanying drawing in detail, like numerals will be used to designate like parts in the different views.

The disk puller as shown in the attached drawing, comprises a cross head 1 having arms 2—2 formed integral with each end and bent at right angle to the cross head 1. The free end of the arm 2, as indicated by the numeral 3 is bent at right angle to the arm 2, and in a line parallel with the cross head 1, the object of which will be better understood as the description proceeds.

Intermediate the cross head 1, same is provided with a screw threaded opening, adapted to receive a jack screw 4, which is provided at one end with an operating lever 5. In order to hold the cross head 1 in a firm position on the screw jack 4, I have provided an auxiliary cross head or plate 6, which is connected with the cross head 1 by means of bolts 7. Loosely positioned on the end of the jack screw 4 is a sleeve 8, provided with diametrically opposite slots 9, which are adapted to be brought into engagement with a clutch spring retaining pin of a disk clutch hub. A screw threaded ratchet nut 10 is positioned on the jack screw 4, between the cross head 1 and the sleeve 8. A ratchet lever 11, carrying a dog 12 is loosely mounted on the screw threaded ratchet nut 10, and upon movement of the lever 11, the ratchet nut 10 is brought into engagement with the outer face 13 of the sleeve 8.

In the operation of my invention, the hooked end 3 of the arms 2, are placed over a flange 14 of the hub 15, of a disk clutch such as used on the Chevrolet engine, as shown in dotted lines in Fig. 1. The jack screw 4, is then brought into engagement with the clutch spring tension rod, not shown, which is positioned within the hub of the disk clutch, and as the jack screw 4 is rotated by means of the handle 5, the hooks 3 are caused to firmly grip the flange 14 of the hub 15, and at the same time the jack screw 4 pressing against the end of the clutch spring tension rod, compresses the spring within the hub, and after this operation has been completed, the ratchet lever 11 is operated to bring the screw threaded ratchet nut 10 into engagement with the face 13 of the sleeve 8, and by means of frictional engagement with same, the sleeve 8 is caused to rotate, thus carrying the clutch spring retaining pin, not shown, with same, so as to bring the clutch spring retaining pin into alinement with an opening 18 in the hub 15, so that a spike or other means may be forced through the opening, thus forcing the retaining pin from its position. After the retaining pin has been removed, the jack screw 4 is again rotated by means of the handle 5, until the disk clutch has been disengaged from the fly wheel 19 and removed from the shaft of same.

When desiring to pull the wheels, sprockets or gears from a shaft, the use of the sleeve 8, ratchet nut 10 and operating means therefor, are dispensed with, as in this instance, the end of the jack screw shaft designated as 17 engages the shaft on which the wheel, sprocket or gear is positioned, and upon rotation of the jack screw 4 by the handle 5, the same is removed from the shaft by means of the hooks 3.

While I have shown and described the preferred form of my invention, I realize that various minor changes may be resorted to, without departing from the spirit and scope of the invention as claimed, therefore, I do not wish to limit myself to the exact details of construction shown, nor to the combination and arrangement of parts.

What I claim as new and desire to secure by Letters Patent is:

1. In a disk clutch puller, the combination of a cross head formed with a pair of hooks on each end, a screw jack operated centrally of the cross head and through same, means loosely carried by one end of the jack screw for engagement with a retaining pin carried by the disk clutch and means rotatably operated on the jack screw for bringing the first mentioned means into holding engagement with said retaining pin.

2. In a disk clutch puller, the combination of a cross head formed with a pair of hooks on each end for engagement with the disk clutch hub, a jack screw operated centrally of the cross head and through same, a sleeve loosely mounted on said jack screw and provided with a pair of oppositely disposed slots for engagement with a retaining pin carried by the disk clutch and a ratchet nut operated on said jack screw for forcing the sleeve into engagement with and rotating said retaining pin.

In testimony whereof I affix my signature.

JOHN RICKART.